(12) United States Patent
Viel

(10) Patent No.: US 7,182,121 B1
(45) Date of Patent: Feb. 27, 2007

(54) INVESTMENT CASTING METHOD AND MATERIALS

(76) Inventor: David W. Viel, 310 N. Howard St. #203, Alexandria, VA (US) 22304

( * ) Notice: Subject to any disclaimer, the term of this patent is extended or adjusted under 35 U.S.C. 154(b) by 7 days.

(21) Appl. No.: 10/878,871

(22) Filed: Jun. 28, 2004

(51) Int. Cl.
*B22D 29/00* (2006.01)

(52) U.S. Cl. ...................... 164/131; 164/519

(58) Field of Classification Search ............ 164/519, 164/131, 132
See application file for complete search history.

(56) References Cited

U.S. PATENT DOCUMENTS

| | | | |
|---|---|---|---|
| 2,502,337 A | 3/1950 | Moir | |
| 2,666,001 A | 1/1954 | Marshall | |
| 2,753,608 A | 7/1956 | Nolan | |
| 3,540,519 A | 11/1970 | Yates | |
| 3,857,435 A * | 12/1974 | Burkert et al. | ............... 164/36 |
| 3,946,039 A | 3/1976 | Walz | |
| 3,966,479 A | 6/1976 | Koblitz | |
| 4,025,361 A | 5/1977 | Lucas | |
| 4,604,142 A | 8/1986 | Kamohara | |
| 5,373,891 A | 12/1994 | Kato | |
| 5,605,943 A * | 2/1997 | Solomon | ............... 523/139 |

* cited by examiner

*Primary Examiner*—Len Tran

(57) ABSTRACT

The present invention consists of an investment casting process that makes use of a frangible low-strength investment material mold and a mold removal solution to facilitate the removal the investment material mold from the casting. The mold removal solution is a liquid that permeates the mold material and effervesces while inside the mold material, causing fracturing of the frangible investment material mold, and carrying away the resulting mold particles. The investment material compositions have the property of sufficiently decreasing in strength after cooling to facilitate the removal of the mold material by the removal solution. Two particular investment material compositions that possesses these properties are describe which contains powdered silica quartz, beta-hemi-hydrate calcium sulfate (gypsum), a hardening agent of potassium sulfate, and water. A mold removal solution composition is described that is composed of hydrogen peroxide solution in water.

1 Claim, 1 Drawing Sheet

Produce Mold from Investment Material Formulated for use with Mold Solvent Solution
10

Produce a Cast Article Using Investment Material Mold
20

Immerse Mold Containing Cast Article in Effervescent Mold Solvent Solution to Remove Mold
30

INVESTMENT CASTING METHOD AND MATERIALS

FEDERALLY SPONSORED RESEARCH

Not applicable

FIELD OF INVENTION

This invention relates to materials used for investment casting and their methods of use.

BACKGROUND OF THE INVENTION

The use of investment casting to produce metal objects with detailed interior structures has grown over the years to include many novel structures and now is used in a wide variety of industrial casting jobs. Complicated components such as turbine blades with interior passages, and cellular solids, have produced a need for investment materials and process that will permit the accurate formation of such parts while facilitating the removal of all investment material residue adhering to the casting.

In the investment casting process an expendable pattern is covered with a slurry suspension of an investment material that subsequently hardens to form a mold. After the investment material has solidified the pattern is removed without disturbing the mold, typically through the application of intense heat that vaporizes the pattern in a process known as the 'burn out'. The resulting, highly detailed, high fidelity, mold cavity is filled with molten metal to create a casting in the shape of the original pattern. When the metal has solidified the casting is freed from the mold by breaking up or dissolving, and thus destroying, the mold.

The general properties for investment materials and the investment casting process are well described for dental, and similarly for jewelry, casting in the standard reference: "Philips' Science of Dental Materials" chapter 22. Bidwell, gives a broad survey of industrial investment materials and processes "Investment Casting", chapters 3 and 5.

Investment materials consist primarily of two ingredients: a refractory and a binder. The majority of the investment material is usually comprised of the refractory, which serves to withstand the intense head of the molten metal during the metal casting procedure. The binder serves to glue the refractory together to create a hard, strong mold that can withstand the weight and force of the molten metal entering the mold. A liquid, usually water, is mixed with the dry refractory and binder to create a slurry of the required density and viscosity for the casting process.

Investment materials have been in use since ancient times and numerous ingredients have been used in their formulations. Modern investment casting processes typically use various types of powered silica as the refractory material with gypsum, phosphate compounds, or silicate compounds as the binder. The liquid solvent is either water or alcohol based, and may contain dissolved agents to aid in the binding process. The gypsum and phosphate binders are primarily used in the dental and jewelry fields, while the silicate binders find greatest use in industrial casting processes.

Numerous properties of investment materials are important to the investment casting process, with some properties more important to specific casting applications than others. Among these properties are high temperature resistance, dimensional stability and change during casting process, strength, and gas permeability or porosity.

The issue of mold strength has been a major focus in the development of investment materials, with the principle aim of increasing the compressive strength of these materials. It is believed that increased strength will produce more accurate molds that will resist cracking or deformation during the investment casting process. To this end various forms of gypsum have been developed for dental and jewelry applications with progressively higher strength, as indicated in Philips'. A lower proportion of water in the investment material mixtures has also been found to increase the strength of investment molds, as is also illustrated in Philips'. Most modern investment mixtures are of the high strength variety.

The investment casting process not only involves the forming of the mold and the casting of the metal, but also requires the removal of the mold after the casting has cooled and sufficiently solidified. Typically, this involves a mechanical "knock-out" of the brittle investment material, either by manually striking the mold with hammering tools, or the use of vibrating equipment, or both. In some cases investment material tenaciously adheres to the casting, or is positioned in inaccessible places on the casting, so alternative means must be used to fully remove all traces of material. These additional methods include mechanical shot blasting, ultrasonic vibration, and chemical means.

The chemical means of removing investment material principally makes use of hydrofluoric acid, as in U.S. Pat. No. 4,025,361, a highly toxic chemical that dissolves the silica refractory component of the investment material. Acids similar to hydroflouric such as flouroboric claimed in U.S. Pat. No. 2,502,337, and flourophosphoric claimed in U.S. Pat. No. 2,666,001 that are also high toxic, corrosive, and environmentally hazardous. Other traditional chemical means make use of strong caustic solutions under heat and pressure. Both the acid and caustic chemical methods are limited to use with a limited number of metals, are dangerous to use, are expensive, and environmentally harmful. A proprietary chemical method of investment material removal is available from Kolene, described in Kolene company literature, which dissolves the investment material in a molten salt but is limited in its application to a residue scavenger process due to the expense and difficulty of use.

The prior art investment removal processes that use mechanical means are limited to mechanical shock and vibration applied to the exterior of the casting that cannot directly access any interior spaces of the casting. The prior art investment removal processes that use chemical means operate by dissolving one or more of the investment material components so as to carry away the components in solution. The high strength of investment materials formulations in prior art also inhibits the removal of the mold after casting due to the low frangibility of the mold material.

Most patents related to investment casting are variations of the basic investment material formulations, and the basic investment casting processes related above, to suit a specific casting application. Numerous patents exist for dental and industrial investment materials. Dental patents such as U.S. Pat. No. 4,604,142 which claims superior qualities of mold expansion while preserving gas permeability, under the typical dental casting process, and U.S. Pat. No. 5,373,891 claims an improved gas permeability of the investment material for typical dental use only. U.S. Pat. No. 2,753,608 also claims improved gas permeability of the investment material mold made with gypsum binder, but only for high-strength molds, and principally claims a non-reactive surface property of the mold for casting easily oxidized. A standard art casting, and mold knockout process, is assumed for all of the investment materials cited in these patents. None of these patents claim any novel properties related to mold removal, or non-mechanical methods of mold removal.

U.S. Pat. No. 3,966,479 claims an investment material made with gypsum binder of lower compression strength than previous materials, but is used for dental work only. This patent assumes the typical dental casting process and knockout of mold by mechanical means and makes no claims as to mold removal in relation to the strength of the investment material or mold.

U.S. Pat. No. 3,540,519 claims an investment material formulated specifically to aid in the removal of the mold after the casting is formed. This mold material is designed to thermally fracture on cooling from the high temperatures after the casting is made. This method is limited to specific casting conditions.

Investment materials and processes for casting detailed interior structures are described in U.S. Pat. No. 3,946,039 for the casting of cellular aluminum foam. The process makes use of a gypsum-binder investment material cast using the block casting process. Several processes to remove the investment material from the interior spaces of the casting are described in this patent. The principle investment removal method is limited to the use of pressure jets of water directed at the investment material to break it into small bits that are subsequently washed away. The depth that the water jet is able to penetrate into the casting interior limits this investment removal process to small castings. Typically the water jet method is limited to removing investment material within two inches from the surface resulting in a maximum casting size in a single dimension of four inches as indicated in the ERG Duocel literature. Large cellular structure castings are not possible by any known method.

SUMMARY OF THE INVENTION

Accordingly, several objects and advantages of my invention are:
1. to produce an investment material composition for creating molds for the investment casting process;
2. to produce a mold removal solution composition;
3. to produce a process that facilitates the removal of the investment material mold from interior voids of a casting using the mold removal solution;
4. to create castings larger than current art allows;
5. to use conventional materials and process conditions with low cost, low toxicity, generally safe, and have low environmental impact.

Still further objects and advantages will become apparent from a consideration of the following description and drawings.

The present invention consists of a process that makes use of a frangible low-strength investment material mold, and a mold removal solution to facilitate the removal the investment material mold from the casting. The mold removal solution is a liquid that permeates the mold material and effervesces while inside the mold material. It is believed that the gas resulting from the effervescence builds up pressure inside the investment material mold causing fracturing of the frangible investment material mold. The mold is reduced to small pieces and powder that are carried away from the casting by the solution and effervescent gas, thus cleaning the casting of all investment material while leaving the casting unharmed and intact. The present invention also consists of particular compositions for use as an investment material to form molds in the investment casting process, and a particular solution composition for removal of the mold after the casting is produced. The investment material is a composition that has the property of sufficient decrease in strength after cooling to facilitate the removal of the mold material by the removal solution. Two particular investment material compositions that possesses these properties are describe which contains powdered silica quartz, beta-hemihydrate calcium sulfate (gypsum), a hardening agent of potassium sulfate, and water. A mold removal solution composition is described that is composed of hydrogen peroxide solution in water. All the particular investment material and investment material removal compositions are produced from common materials that are of low cost, low toxicity, use techniques that are known to the art, and have low environmental impact.

DETAILED DESCRIPTION OF THE PREFERRED EMBODIMENTS

Figure 1:
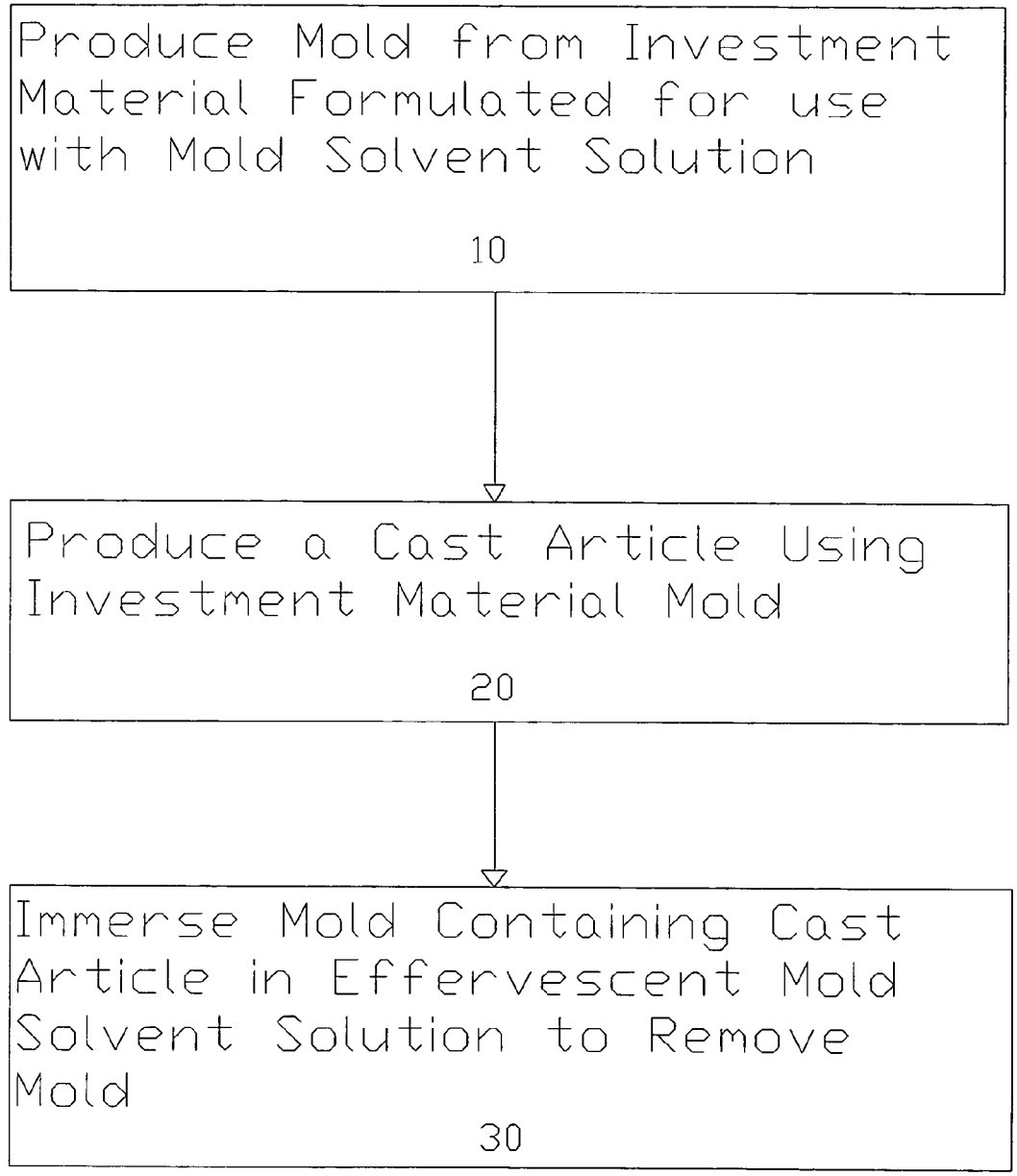
FIG. 1 shows a flowchart detailing the investment casting process.

This invention is a process of investment casting using a novel investment material and a novel mold removal solution.

The investment material has a number of advantageous properties. The investment material is able to withstand the high temperatures encountered in the pattern removal process and from the molten metal melt. The investment material is sufficiently strong to maintain the mold shape during the pattern removal process, and resist the impinging force of the molten metal during the pour. The investment material looses sufficient strength after the cool down period, and is sufficiently porous, to facilitate the removal of the mold, from the resulting casting, by the use of the mold removal solution.

The mold removal solution has the following advantageous properties. The solution is able to permeate and infiltrate the investment material mold after the cool down period of the casting process. The solution effervesces while it is infiltrated and permeated into the investment material mold resulting in an increase in fluid pressure internal to the mold material.

The investment materials and mold removal solution compositions are produced from common materials that are of low cost, low toxicity, use techniques that are known to the art, and have low environmental impact.

This process is comprised of the following steps:
1. A mold is produced using a novel investment material. The mold has the properties necessary for successfully producing a cast article during the prior art steps of investment casting. These include investing the pattern, removing the pattern, pouring the metal melt and cooling down the cast article encased by the mold. The mold also is of sufficiently low strength to facilitate the removal of the investment material mold from the resulting cast article by the use of the mold removal solution. See FIG. 1 step 10.
2. A casting is produced using a mold made of a novel investment material and techniques known to the art. See FIG. 1 step 20.
3. The mold containing the cast article is immersed in the mold removal solution to soak for a sufficient period that the entire investment material mold is dislodged from the cast article. The mold removal solution permeates and infuses into the investment material mold during the soaking period. The mold removal solution effervesces while permeated inside the investment material mold, resulting in an increase of fluid pressure within the mold material. It is believed that the increased pressure causes mechanical fracture of the frangible mold material resulting in small pieces of mold being dislodged. The solution, and expelled effervescent gas, carries the dislodged pieces of mold away thus exposing new mold surface to the solution. The result is a cast article clean of investment on its exterior and throughout its interior. See FIG. 1 step 30.

Novel formulations of gypsum based investment material, in the family of gypsum based investment materials that are known to the art, are described here. The ingredients of the investment material compounds include, ground quartz, 325 mesh; β-hemi-hydrate gypsum, known as #1 molding plaster in the trade; potassium sulfate; and de-ionized water.

A plaster composition is specified in the particular claimed formulations, as a combination by weight of the potassium sulfate together with the gypsum hemi-hydrate, although these two ingredients are not blended together in the dry form. The plaster composition is typically composed of 99.6% wt. gypsum hemi-hydrate with 0.4% potassium sulfate, but may range from 100% gypsum hemi-hydrate with 0.0% potassium sulfate, to 97.0% gypsum hemi-hydrate with 3.0% potassium sulfate. The potassium sulfate acts as a hardener and setting accelerator agent.

The investment material formulations are further defined by the fractions of ground quartz and plaster composition. For the particular formulations claimed here, the fractions range form 70% wt. ground quarts with 30% wt. plaster composition, to 90% wt. ground quartz with 10% wt. plaster composition.

The amount of water is formulated in proportion to the combined weight of ground quartz and plaster composition in a ratio known to the art as the W/P ratio, with W the weight of the water and P the combined weight of the ground quartz and plaster composition. The W/P ratios for the particular claimed formulations range from W/P=0.50 to W/P=0.70.

Two particular compositions that show particularly effective properties are claimed.
1. A formulation with plaster composition of 99.6% wt. gypsum β-hemi-hydrate with 0.4% wt. potassium sulfate. This formulation has the fraction of 85% ground quartz with 15% plaster composition A W/P ratio of 0.55 water to combined ground quartz and plaster composition.
2. A formulation with plaster composition of 99.6% wt. gypsum β-hemi-hydrate with 0.4% wt. potassium sulfate. This second formulations has the fraction of 8% ground quartz with 20% plaster composition. A W/P ratio of 0.60 water to combined ground quartz and plaster composition.

The properties of the above formulations are dependent on the method used to combine the ingredients and invest the pattern. The dry ingredients of ground quartz and gypsum hemi-hydrate, are thoroughly blended prior to mixing the investment material for investing the pattern. The potassium sulfate is dissolved in the water. The water solution and dry ingredients are blended under vacuum for a period of approximately 90 seconds. The pattern is invested under vacuum while vibration is applied for approximately 90 seconds. The vacuum is removed and the mold allowed to harden.

One composition of investment removal solution is claimed. The removal solution is composed principally in the proportions of 90% wt. water with 10% wt. hydrogen peroxide, but may vary over the range of 97% wt. water with 3% wt. hydrogen peroxide, to 70% wt water with 30% wt. hydrogen peroxide.

Accordingly, the reader will see that the method described will produce a cast article that is clean from residual investment material after the cleaning, including the internal spaces of the cast article. Thus the invention has further embodiments and ramifications, such as:

Ease of implementing this process with facilities that are used in the art.

Cost competitive with existing methods used in the art.

Low environmental impact compared with existing methods used in the art.

Increased safety of the mold removal compared with existing methods used in the art.

Other formulations of investment materials from ingredients that are known to the art are possible. Compounds that have the properties of sufficient strength during the previously described process to act as a mold for casting, but have sufficiently low strength after the beat cycle of the casting process to enable the investment removal compound to dislodge the mold material. These ingredients include, but are not limited to, other refractory material such as forms of silica such a christobalite, fused quarts and tridymite.

Other binder materials, such as forms of gypsum, such as α-hemi-hydrate varieties, phosphate binders, silicate binders. Also, a variety of accelerators, retarding agents, and hardeners that are known to the art may be used in the compounds. The compound may be produced from any combination of these ingredients to achieve the required physical properties of porosity and strength at the various points in the casting cycle.

Although the description above contains much specificity, these should not be construed as limiting the scope of the invention, but merely providing illustrations of some of the presently preferred embodiment of the invention.

Thus the appended claims and their legal equivalents should determine the scope of the invention, rather than the examples given.

I claim:

1. A method for producing investment cast articles, comprising the steps of:
   (a) providing an investment mold material,
   (b) providing an effervescent mold solvent solution that is able to permeate the mold material encasing the cast article, and effervesce while interior to the mold material,
   (c) providing a melt to form the cast article,
   (d) producing a mold from said investment mold material, having the property, after casting, of sufficiently low strength, and sufficient porosity, to allow removal of the mold from the cast article by said mold solvent solution, where the final modulus of rupture strength of the mold material, after a cast article has been produced, is less than 11% about 15 psi,
   (e) producing the cast article from melt using said investment mold and allowing to cool,
   (f) immersing the mold encased cast article in the mold solvent solution for a sufficient period to effect mold removal,
   whereby said investment material mold is removed from casting thus leaving a casting clean of investment martial residue.

* * * * *